United States Patent
Aguilar et al.

(10) Patent No.: US 10,839,221 B2
(45) Date of Patent: Nov. 17, 2020

(54) SYSTEMS AND METHODS FOR COMPILED VIDEO GENERATION

(71) Applicant: Facebook, Inc., Menlo Park, CA (US)

(72) Inventors: Justin David Aguilar, San Francisco, CA (US); John Samuel Barnett, Newark, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/387,539

(22) Filed: Dec. 21, 2016

(65) Prior Publication Data

US 2018/0174616 A1    Jun. 21, 2018

(51) Int. Cl.
*G06K 9/00* (2006.01)
*G11B 27/036* (2006.01)

(52) U.S. Cl.
CPC ..... *G06K 9/00718* (2013.01); *G06K 9/00765* (2013.01); *G11B 27/036* (2013.01)

(58) Field of Classification Search
CPC ..... G11B 27/034; G11B 27/105; G11B 27/34; H04N 5/85; H04N 9/8042; H04N 21/2353; H04N 21/435; H04N 21/8456; H04N 21/8549; H04N 21/25891; H04N 21/26258; H04N 21/439; H04N 21/812; H04R 3/04; H04R 29/00; H04S 7/30
USPC .......................... 386/278, 244, 333; 700/94
See application file for complete search history.

(56) References Cited

U.S. PATENT DOCUMENTS

| | | | |
|---|---|---|---|
| 9,525,896 B2 * | 12/2016 | Rayter | H04N 21/8549 |
| 2002/0106191 A1 * | 8/2002 | Betz | G11B 27/034 386/244 |
| 2015/0073574 A1 * | 3/2015 | Brenner | H04H 60/47 700/94 |
| 2015/0294685 A1 * | 10/2015 | Bloch | G11B 27/034 386/278 |
| 2018/0014066 A1 * | 1/2018 | Berman | H04N 21/4312 |

* cited by examiner

*Primary Examiner* — Thai Q Tran
*Assistant Examiner* — Syed Y Hasan
(74) *Attorney, Agent, or Firm* — Sheppard Mullin Richter & Hampton LLP

(57) ABSTRACT

Systems, methods, and non-transitory computer-readable media can determine one or more source video clips. A plurality of video segments are selected from the one or more source video clips based on video segment selection criteria. A compiled video is generated comprising the plurality of video segments.

20 Claims, 7 Drawing Sheets

SYSTEMS AND METHODS FOR COMPILED VIDEO GENERATION

FIELD OF THE INVENTION

The present technology relates to the field of content generation. More particularly, the present technology relates to generation of compiled videos.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

User experience associated with a social networking system can be enhanced as the social networking system becomes more knowledgeable about the users that it serves. When knowledge of a user is gained, content, advertising, tools, and other services can be optimized for presentation to the user. Such potentially helpful knowledge about the user can include information about the user as an individual as well as the user's activity on the social networking system. Knowledge about the user can be utilized to provide features and content that increase user interest in and engagement with the social networking system.

SUMMARY

Various embodiments of the present disclosure can include systems, methods, and non-transitory computer readable media configured to determine one or more source video clips. A plurality of video segments are selected from the one or more source video clips based on video segment selection criteria. A compiled video is generated comprising the plurality of video segments.

In an embodiment, a first theme is identified, and the plurality of video segments are selected based on the first theme.

In an embodiment, the first theme is an automatically determined theme based on video characteristics of the one or more source video clips.

In an embodiment, the first theme is a user-specified theme.

In an embodiment, a second theme is identified. A second plurality of video segments are selected from the one or more source video clips based on the second theme. A second compiled video is generated comprising the second plurality of video segments.

In an embodiment, the compiled video and the second compiled video are presented for selection by a user.

In an embodiment, the first theme is identified based on at least one of objection recognition or facial recognition performed using machine learning techniques.

In an embodiment, the plurality of video segments are selected based on at least one of object recognition or facial recognition performed using machine learning techniques.

In an embodiment, the plurality of video segments are selected based on user characteristic information.

In an embodiment, video normalization of the plurality of video segments in the compiled video is performed.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
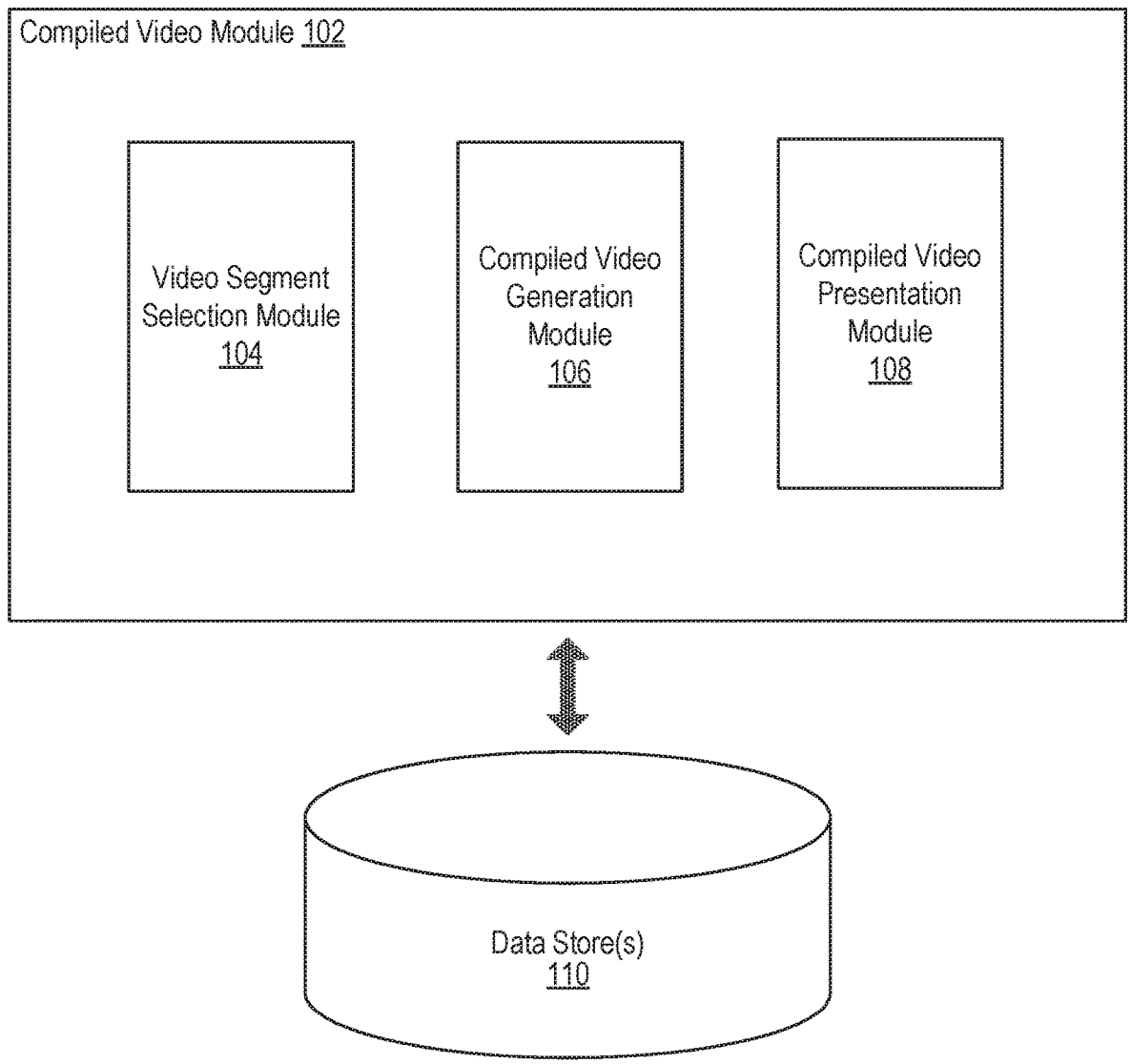
FIG. 1 illustrates an example system including a compiled video module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Compiled Video Generation

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (i.e., a social networking service, a social network, etc.). For example, users can add friends or contacts, provide, post, or publish content items, such as text, notes, status updates, links, pictures, videos, and audio, via the social networking system.

User experience associated with a social networking system can be enhanced as the social networking system becomes more knowledgeable about the users that it serves. When knowledge of a user is gained, content, advertising, tools, and other services can be optimized for presentation to the user. Such potentially helpful knowledge about the user can include information about the user as an individual as well as the user's activity on the social networking system. Knowledge about the user can be utilized to provide features and content that increase user interest in and engagement with the social networking system.

It continues to be an important interest for a social networking system to provide users with tools to easily post interesting and high quality content to the social networking system. Such tools can lead to greater numbers of interesting content posts on the social networking system. Greater numbers of interesting content posts lead to greater engagement and interaction on the social networking system. However, it can be difficult to provide users with such tools. This remains true despite, and potentially partly due to, the ease with which users can capture content using improving technologies, such as improved cameras on mobile devices. While these improving technologies may make it easier for users to capture content, users may be hesitant to share this content on a social networking system. This may be for various reasons. For example, users may be reluctant share large amounts of content for fear of inundating or boring their social networking system connections with uninteresting content. Users may also be reluctant to take the time to comb through their enormous content libraries to select the "best" content to share on the social networking system. For these reasons, the ease with which users are able to capture content may actually act as a hindrance to user content posting on a social networking system.

An improved approach rooted in computer technology overcomes the foregoing and other disadvantages associated with conventional approaches specifically arising in the realm of computer technology. Based on computer technology, the disclosed technology can generate compiled videos comprising a plurality of video segments selected from one or more source video clips. A video segment can be understood to represent a portion of a video clip. A compiled video can include the most interesting or relevant video segments of one or more source video clips. As such, a compiled video can represent a condensed version of a single source video clip, or a condensed compilation of multiple source video clips. In certain embodiments, the compiled video may be of a fixed, pre-defined duration. Source video clips and/or video segments can be selected based on various selection criteria. For example, source video clips and/or video segments may be selected based on common items and/or themes present in the source video clips. For example, if a user wishes to create a "friends"-themed compiled video, video segments may be selected from source video clips such that the video segments include portions of the source video clips in which a user's connections on a social networking system are depicted. In another example, if it is determined that a plurality of source video clips depict various points of interest, the source video clips can be cropped into only those video segments that depict points of interest for inclusion in a "points of interest"-themed compiled video. In various embodiments, video segments in a compiled video may be edited and/or "normalized" to create a consistent look and feel for the compiled video.

In certain embodiments, using a single set of source video clips, multiple compiled videos may be generated and presented to a user for potential selection. For example, based on a single set of source video clips, a "friends"-themed compiled video may be generated, and a "points of interest"-themed compiled video may be generated, and an "animals"-themed compiled video may be generated. The user can then select one or more of the compiled videos to, for example, post to a social networking system. These concepts, and others, will be discussed in greater detail herein.

FIG. 1 illustrates an example system 100 including an example compiled video module 102 configured to generate compiled videos, according to an embodiment of the present disclosure. In certain embodiments, a set of one or more source video clips can be determined. Video segments can be selected from the set of one or more source video clips, and the video segments can be combined to create a compiled video. Video segments may be selected so as to create a compiled video of a fixed duration. For example, if a user wishes to create a compiled video having a duration of one minute, video segments totaling one minute in duration may be selected, or video segments may be selected and edited so that the compiled video is one minute long. Video segments can be selected based on various video segment selection criteria. In certain embodiments, source video clips can be analyzed to automatically determine a common theme, and video segments can be selected based on the common theme. In various embodiments, themes may be automatically determined using machine learning techniques, such as object recognition and/or facial recognition. In other embodiments, a user may provide a user-specified theme, and video segments can be selected based on the user-specified theme. Once a plurality of video segments are selected, they can be combined into a compiled video. Video segments in a compiled video may be edited and/or normalized to create a consistent look and feel for the compiled video. In certain embodiments, multiple compiled videos can be generated and presented for possible selection by a user.

As shown in the example of FIG. 1, the compiled video module 102 can include a video segment selection module 104, a compiled video generation module 106, and a compiled video presentation module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

The compiled video module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the compiled video module 102 can be implemented, in part or in whole, as software running on one or more computing devices or systems, such as on a server computing system or a user (or client) computing system. For example, the compiled video module 102, or at least a portion thereof, can be implemented as or within an application (e.g., app), a program, or an applet, etc., running on a user computing device or a client computing system, such as the user device 610 of FIG. 6. In another example, the compiled video module 102 or at least a portion thereof can be implemented using one or more computing devices or systems that include one or more servers, such as network servers or cloud servers. In some instances, the compiled video module 102 can, in part or in whole, be implemented within or configured to operate in conjunction with a social networking system (or service), such as the social networking system 630 of FIG. 6. It should be understood that there can be many variations or other possibilities.

The compiled video module 102 can be configured to communicate and/or operate with the at least one data store 110, as shown in the example system 100. The data store 110 can be configured to store and maintain various types of data. In some implementations, the data store 110 can store information associated with the social networking system (e.g., the social networking system 630 of FIG. 6). The information associated with the social networking system can include data about users, user identifiers, social connections, social interactions, profile information, demographic information, locations, geo-fenced areas, maps, places, events, pages, groups, posts, communications, content, feeds, account settings, privacy settings, a social graph, and various other types of data. In some embodiments, the data store 110 can store information that is utilized by the compiled video module 102. For example, the data store 110 can store source video clips, video segment selection criteria, user engagement information, video filter information, and the like. It is contemplated that there can be many variations or other possibilities.

The video segment selection module 104 can be configured to select video segments from one or more source video clips based on video segment selection criteria. A set of one or more source video clips can be determined. For example, the one or more source video clips may include video clips selected by a user, or video clips that have been grouped together based on video clip selection criteria. Video clips can be grouped based on any relevant video characteristics, such as time of capture, location of capture, or content depicted in the video clips, to name a few examples. In various embodiments, one video segment can be selected from each source video clip, multiple video segments can be selected from a single source video clip, multiple video segments can be selected from each source video clip, and/or one or more video segments can be selected from a subset of the source video clips.

Video segments can be selected from the one or more source video clips based on video segment selection criteria. In certain embodiments, video segments can be assigned video segment scores based on the video segment selection criteria, and video segments can be selected based on video segment scores. Video segment selection criteria can include a number of considerations. In one example, video segments can be selected based on duration information to generate a compiled video of a pre-defined duration. Duration information can define a compiled video duration and/or a video segment duration. Video segments can also be selected based on various video characteristics. Video characteristics can include visual characteristics, audio characteristics, movement characteristics, and/or social engagement characteristics, as will be described in greater detail below. Video segments may be selected based on a particular theme. In certain embodiments, themes may be user-defined. For example, a user may wish to create a "travel"-themed compiled video, and source video clips may be analyzed to identify video segments that are associated with travel. In other embodiments, themes may be automatically and dynamically determined. In certain embodiments, themes can be automatically determined based on video characteristics of the source video clips. For example, a set of source video clips can be analyzed to determine one or more common themes that occur in the source video clips. For example, if a set of source video clips each include segments which depict nature, this theme may be identified and video segments selected based on the identified theme. A compiled video can then be generated for each identified theme. If multiple themes are identified, multiple compiled videos can be generated (e.g., one for each identified theme). In various embodiments, automated theme determination and/or selection of video segments based on themes may be performed using machine learning techniques. For example, machine learning techniques can be used to identify various people (e.g., via facial recognition) and/or objects depicted in videos (e.g., via object recognition) to determine commonalities that may be used as themes. Once a theme is established, machine learning techniques can be used to identify video segments that are associated with the theme. The video segment selection module 104 is described in greater detail herein with reference to FIG. 2.

The compiled video generation module 106 can be configured to generate a compiled video from a plurality of video segments. Video segments that have been selected by the video segment selection module 104 can be combined into a compiled video. In certain embodiments, video segments in a compiled video may be edited and/or normalized. For example, visual and/or audio features may be edited for each video segment to create a consistent look and feel for the compiled video. The compiled video generation module 106 is described in greater detail herein with reference to FIG. 4.

The compiled video presentation module 108 can be configured to present one or more compiled videos for selection by a user. In certain embodiments, one or more compiled videos can be presented to a user. The user can select a compiled video for, for example, posting to a social networking system. For example, a user may be presented with multiple compiled videos, each compiled video corresponding to a particular theme. The user can select one compiled video and can edit the compiled video. Editing options may include applying a visual and/or audio filter to the compiled video, or modifying the duration of the compiled video, or applying effects to one or more video segments in the compiled video. The user can then post the compiled video to a social networking system.

Figure 2:
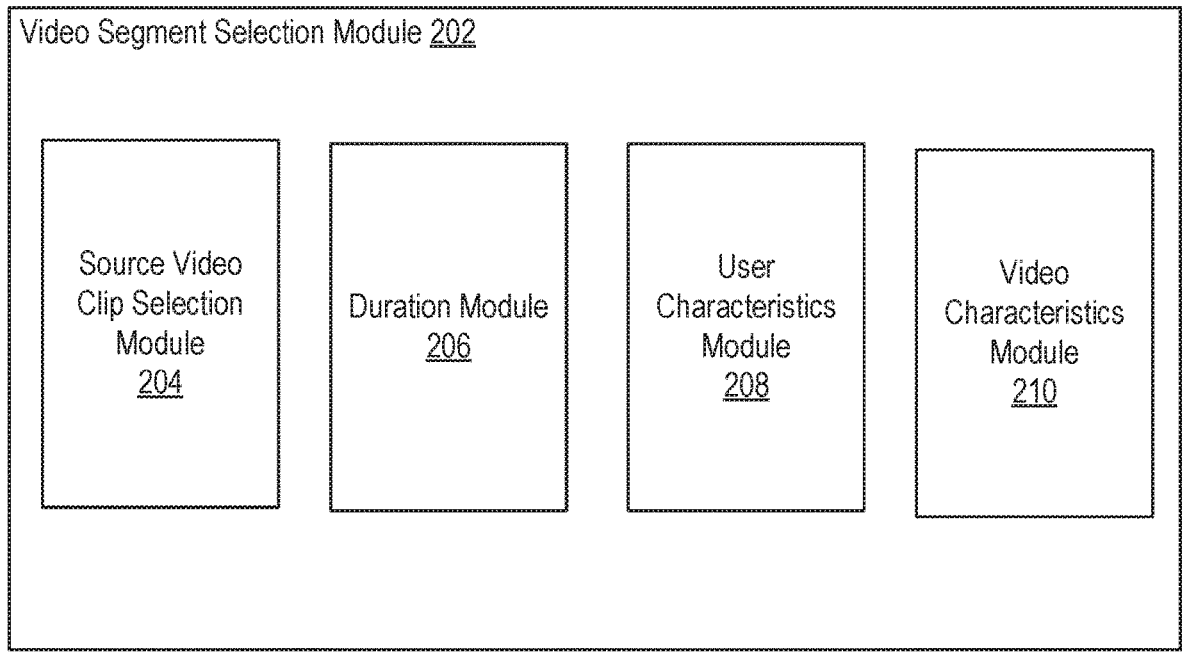
FIG. 2 illustrates an example video segment selection module, according to an embodiment of the present disclosure.

FIG. 2 illustrates an example video segment selection module 202 configured to select a plurality of video segments from one or more source video clips based on video segment selection criteria, according to an embodiment of the present disclosure. In some embodiments, the video segment selection module 104 of FIG. 1 can be implemented as the example video segment selection module 202. As shown in FIG. 2, the video segment selection module 202 can include a source video clip selection module 204, a duration module 206, a user characteristics module 208, and a video characteristics module 210.

The source video clip selection module 204 can be configured to determine one or more source video clips. In certain embodiments, source video clips may be defined by a user. For example, a user can select one or more source video clips from which to create a compiled video. In other embodiments, source video clips may be automatically determined based on video clip selection criteria. For example, if a user selects a particular theme for a compiled video, all source video clips containing video segments that relate to the theme may be selected. Source video clips may also be selected, for example, based on time of capture (e.g., all video clips captured in the past 24 hours, or the past week, or the past month, or the past year, or captured during a particular date range, etc.) and/or based on location of capture (e.g., based on geo-tag information).

The duration module 206 can be configured to select video segments based on duration information. Video segments may be selected based on video segment duration information specifying a video segment duration and/or compiled video duration information specifying a duration for a compiled video. For example, if a user specifies that he or she would like a compiled video containing three-second video segments, one three-second video segment can be selected from each source video clip. Or if a user specifies that he or she would like a one-minute compiled video generated from a set of source video clips, video segments may be selected that total one minute in duration. In certain embodiments, a user may define a compiled video duration, and video segments of equal duration may be selected from each source video clip so as to total the compiled video duration. For example, if a user specifies that he or she would like a compiled video having a duration of 30-seconds, and there are six source video clips, a five-second video segment can be selected from each source video clip. In certain embodiments, certain video segments may be excluded on the basis of a duration characteristic. For example, if a particular video segment includes a user speaking for six seconds, that video segment may be excluded, so as not to cut off the user's speech, if the duration characteristic specifies a video segment duration of less than six seconds. In certain embodiments, the duration of a compiled video may be determined by a maximum video duration set by a social networking system.

The user characteristics module 208 can be configured to select video segments based on user characteristic information. In certain embodiments, a user's interests, tendencies, and/or preferences can be determined to inform video segment selection. If a user is attempting to generate a compiled video, the user's previous content postings to a social networking system can be analyzed to determine the user's interests and preferences. Different users having different interests and preferences may result in different compiled videos based on the users' differing characteristics, even if the same set of source video clips are used. Consider the example scenario of a set of source video clips which depict users camping. If it is determined that a first user posts a large number of content items about nature without people being depicted in them, video segments may be selected from the set of source video clips which depict nature without depicting people. However, a second user may have a tendency to post portrait-type content items that focus on people. If the second user creates a compiled video from the same set of source video clips, the second user's compiled video may include only those video segments from the source video clips that include close-ups of people.

The video characteristics module 210 can be configured to select video segments based on video characteristic information. Video characteristics can include visual characteristics (e.g., objects and/or people depicted in a video), audio characteristics (e.g., audio content detected in a video), movement characteristics (e.g., camera movement information during capture of a video), and/or user engagement characteristics (e.g., user engagement with video clips on a social networking system). The video characteristics module 210 will be described in greater detail herein with reference to FIG. 3.

Figure 3:
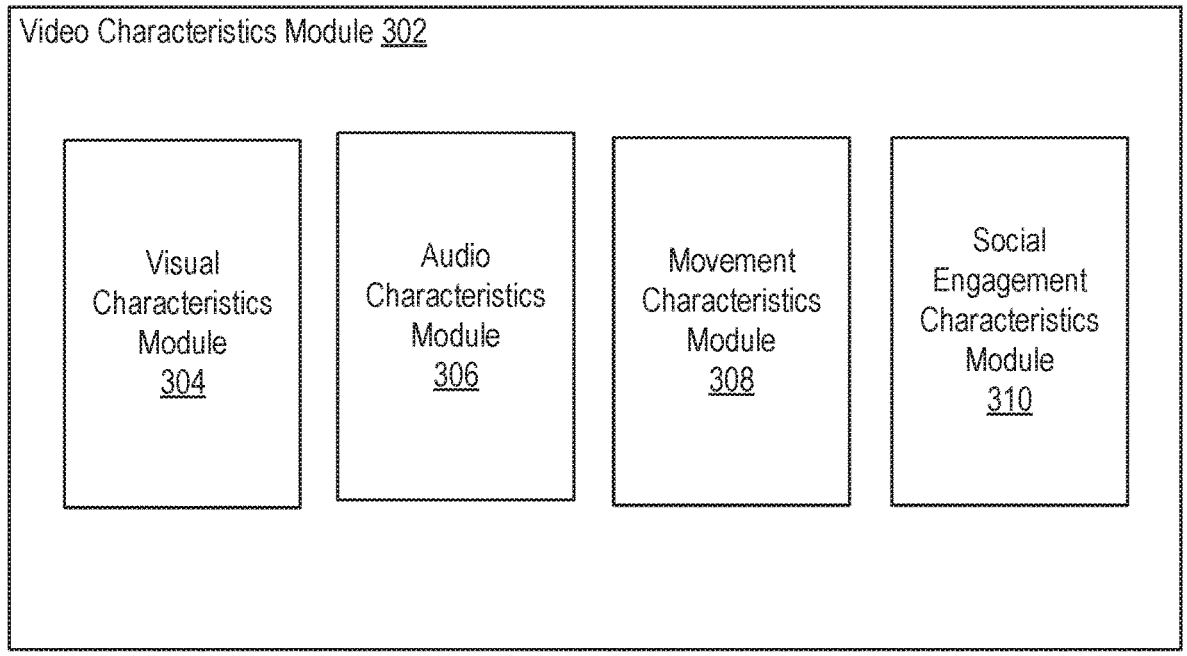
FIG. 3 illustrates an example video characteristics module, according to an embodiment of the present disclosure.

FIG. 3 illustrates an example video characteristics module 302 configured to select one or more video segments based on video characteristic information, according to an embodiment of the present disclosure. In some embodiments, the video characteristics module 210 of FIG. 2 can be implemented as the example video characteristics module 302. As shown in FIG. 3, the video characteristics module 302 can include a visual characteristics module 304, an audio characteristics module 306, a movement characteristics module 308, and a social engagement characteristics module 310.

The visual characteristics module 304 can be configured to select video segments based on visual information. In certain embodiments, the visual characteristics module 304 can be configured to perform object recognition to identify objects depicted in video clips and segments. Video segments can be selected based on objects depicted in video segments. For example, if it is determined that each source video clip includes a video segment in which a landmark is depicted, video segments depicting landmarks can be selected to generate a landmark-theme compiled video. In certain embodiments, the visual characteristics module 304 can be configured to perform facial recognition to identify people depicted in video clips and segments. Video segments can be selected based on people depicted in video segments. For example, if it is determined that each source video clip includes a video segment depicting a particular person, a compiled video can be generated of video segments depicting the person. In various embodiments, visual characteristic analysis, such as object recognition and facial recognition, can be performed using machine learning techniques. In certain embodiments, video segments may be selected based on a visual quality determination such that video segments having higher visual quality are selected and/or upranked.

The audio characteristics module 306 can be configured to select video segments based on audio information. For example, if video segments are being selected that relate to a particular topic, audio analysis can be performed to determine video segments in which the particular topic is being discussed. In various embodiments, audio analysis can be performed using machine learning techniques. In certain embodiments, video segments may be selected based on an audio quality determination such that video segments having higher audio quality are selected and/or upranked.

The movement characteristics module 308 can be configured to select video segments based on camera movement information. For example, in certain embodiments, video segments may be selected based on how still a camera is during video capture. Camera stillness may be an indication of higher video quality, and/or an indication that the subject matter being captured is of particular importance. For example, a user might have their camera turned on because they have been told that a celebrity is nearby, and the user may run over to find the celebrity, during which the camera would be shaking, and then the user may steady the camera to capture video of the celebrity. In this case, the stillness of the camera is a positive indicator of importance. In other examples, movement of the camera may be a positive indicator of importance. For example, if an action is being captured (e.g., running), movement of the camera may indicate that an action is taking place, while stillness indicates an end to the action. Camera movement information may be captured by a movement detection device associated with the camera, such as a gyroscope.

The social engagement characteristics module 310 can be configured to select video segments based on social engagement information. In certain embodiments, social engagement information may be measured by a social networking system. For example, consider a scenario where a source video clip is a live social networking system broadcast in which viewers are able to interact with the broadcast in real-time during the broadcast (e.g., by clicking on various reaction icons). Social engagement information can be used to determine which video segments had the highest number of viewers and/or the highest number of responses. In the example of the real-time social networking system broadcast, a "summary" video can be created by gathering all the video segments that had the highest user engagement and merging them into a compiled video.

While several examples of video segment selection criteria have been discussed in the present disclosure (e.g., video segment selection criteria based on duration information, user characteristic information, visual information, audio information, movement information, social engagement information, etc.), it should be understood that other video segment selection criteria not specifically discussed herein can also be utilized.

Figure 4:
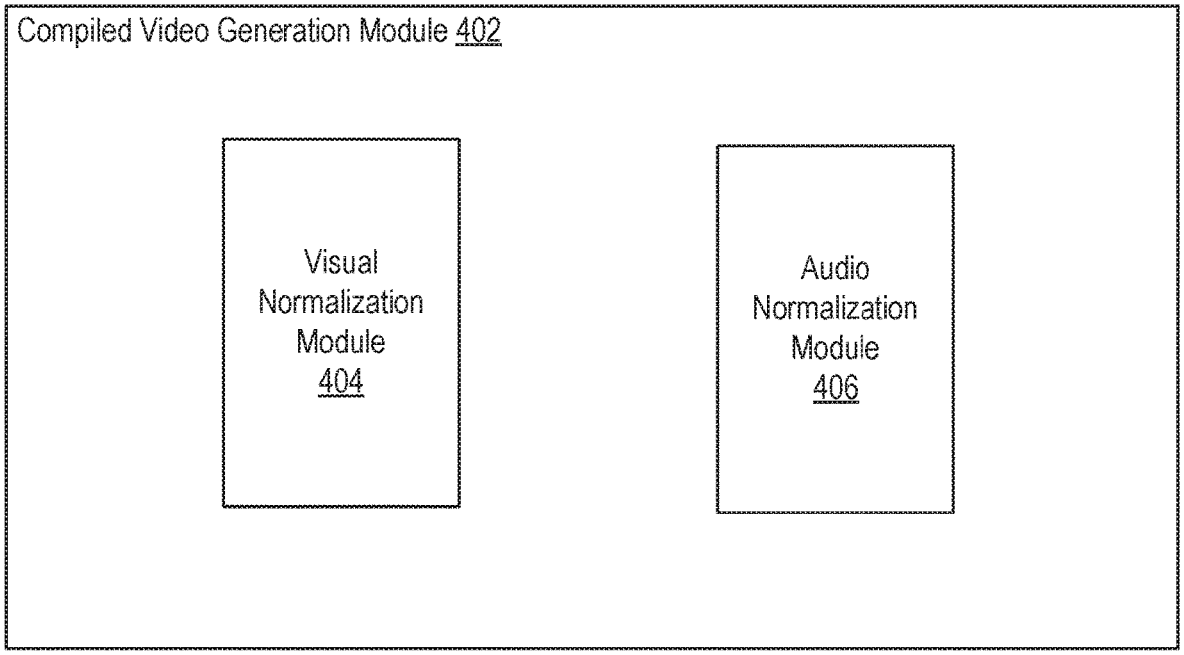
FIG. 4 illustrates an example compiled video generation module, according to an embodiment of the present disclosure.

FIG. 4 illustrates an example compiled video generation module 402 configured to generate compiled videos, according to an embodiment of the present disclosure. In some embodiments, the compiled video generation module 106 of FIG. 1 can be implemented as the example compiled video generation module 402. As shown in FIG. 4, the compiled video generation module 402 can include a visual normalization module 404 and an audio normalization module 406.

The visual normalization module 404 can be configured to normalize visual aspects of video segments in a compiled video. It may be desirable to create a consistent look and feel across video segments in a compiled video so as to create a more polished finished product. The visual normalization module 404 can be configured to create visual consistency between video segments in a compiled video. For example, the visual normalization module 404 can be configured to perform white balancing to adjust color temperatures in video segments to be substantially similar to one another, and/or to adjust exposures and/or brightness settings in video segments so that one video segment is not significantly brighter than another. In certain embodiments, visual characteristics of a first set of video segments of a compiled video may be adjusted to match visual characteristics of a second set of video segments of the compiled video. In certain embodiments, a visual filter can be applied to the plurality of video segments in a compiled video.

The audio normalization module 406 can be configured to normalize audio aspects of video segments in a compiled video. Again, just as it may be desirable to create a consistent visual look and feel across video segments in a compiled video, it may be desirable to create a consistent audio experience across the compiled video. This may include, for example, adjusting volume settings in different video segments to create a substantially consistent volume level between video segments. In certain embodiments, an audio portion of a single video segment may be selected to play across the plurality of video segments in a compiled video. For example, a user may wish to create a slide show and/or compilation video. The user could include a plurality of source video clips that he wants to include in the compiled video, and could select another source video clip that includes an audio portion (e.g., a song) that he wants to play throughout the compiled video. Or if the user would like to create an instructional video, the user can create a single source video clip that narrates the instructions, while the remaining source video clips visually depict each step in the instructions. The narration audio can play through the plurality of video segments in the compiled video. In certain embodiments, audio characteristics of a first set of video segments of a compiled video may be adjusted to match audio characteristics of a second set of video segments of the compiled video.

Figure 5:
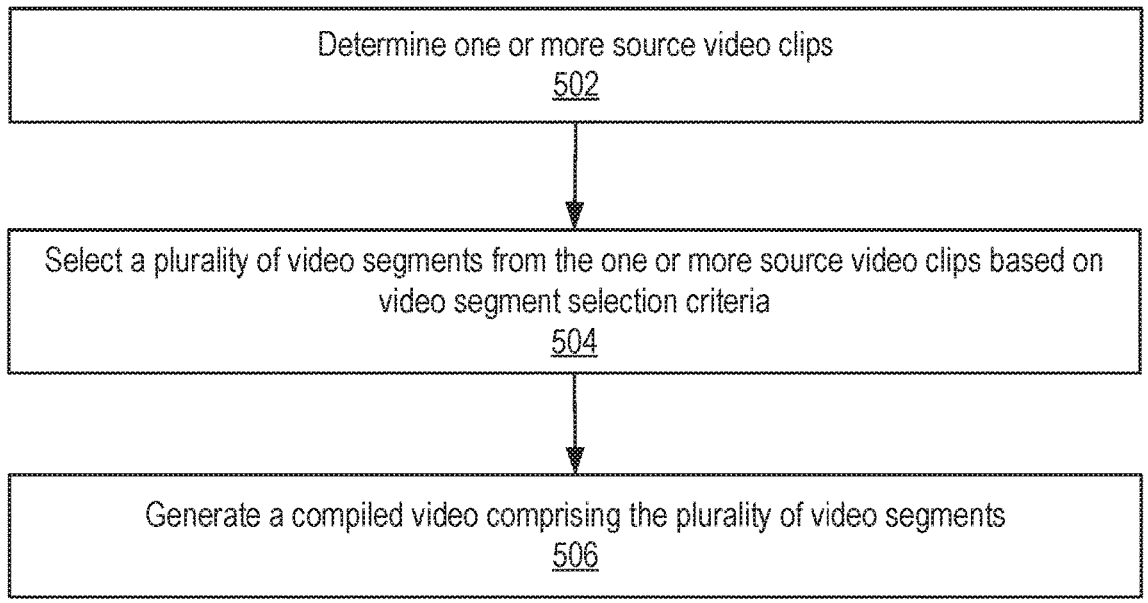
FIG. 5 illustrates an example method associated with generating compiled videos, according to an embodiment of the present disclosure.

FIG. 5 illustrates an example method 500 associated with generating a compiled video, according to an embodiment of the present disclosure. It should be appreciated that there can be additional, fewer, or alternative steps performed in similar or alternative orders, or in parallel, based on the various features and embodiments discussed herein unless otherwise stated.

At block 502, the example method 500 can determine one or more source video clips. At block 504, the example method 500 can select a plurality of video segments from the one or more source video clips based on video segment selection criteria. At block 506, the example method 500 can generate a compiled video comprising the plurality of video segments. Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 6:
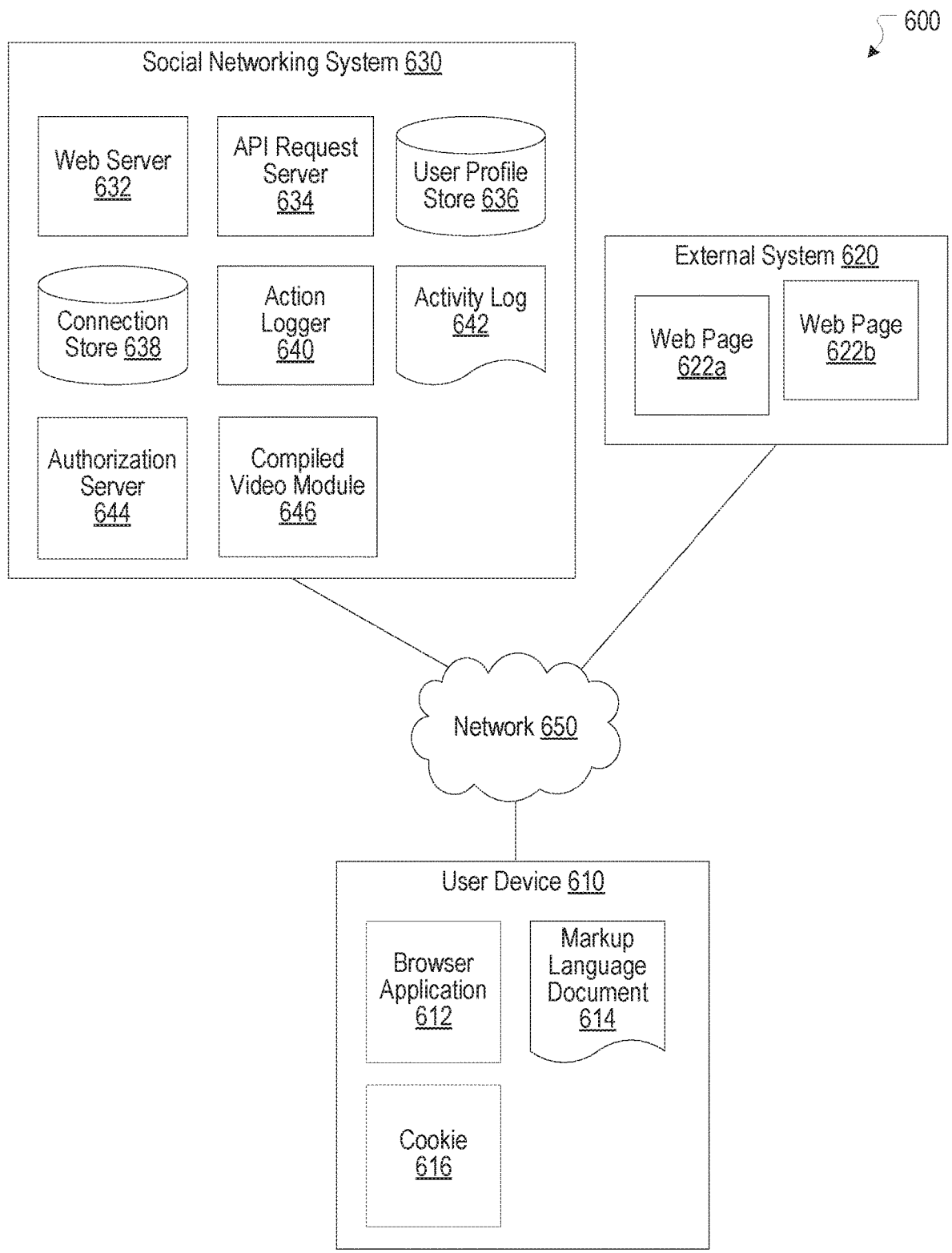
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include compiled video module 646. The compiled video module 646 can, for example, be implemented as the compiled video module 102, as discussed in more detail herein. As discussed previously, it should be appreciated that there can be many variations or other possibilities. For example, in some embodiments, one or more functionalities of the compiled video module 646 can be implemented in the user device 610.

Hardware Implementation

Figure 7:
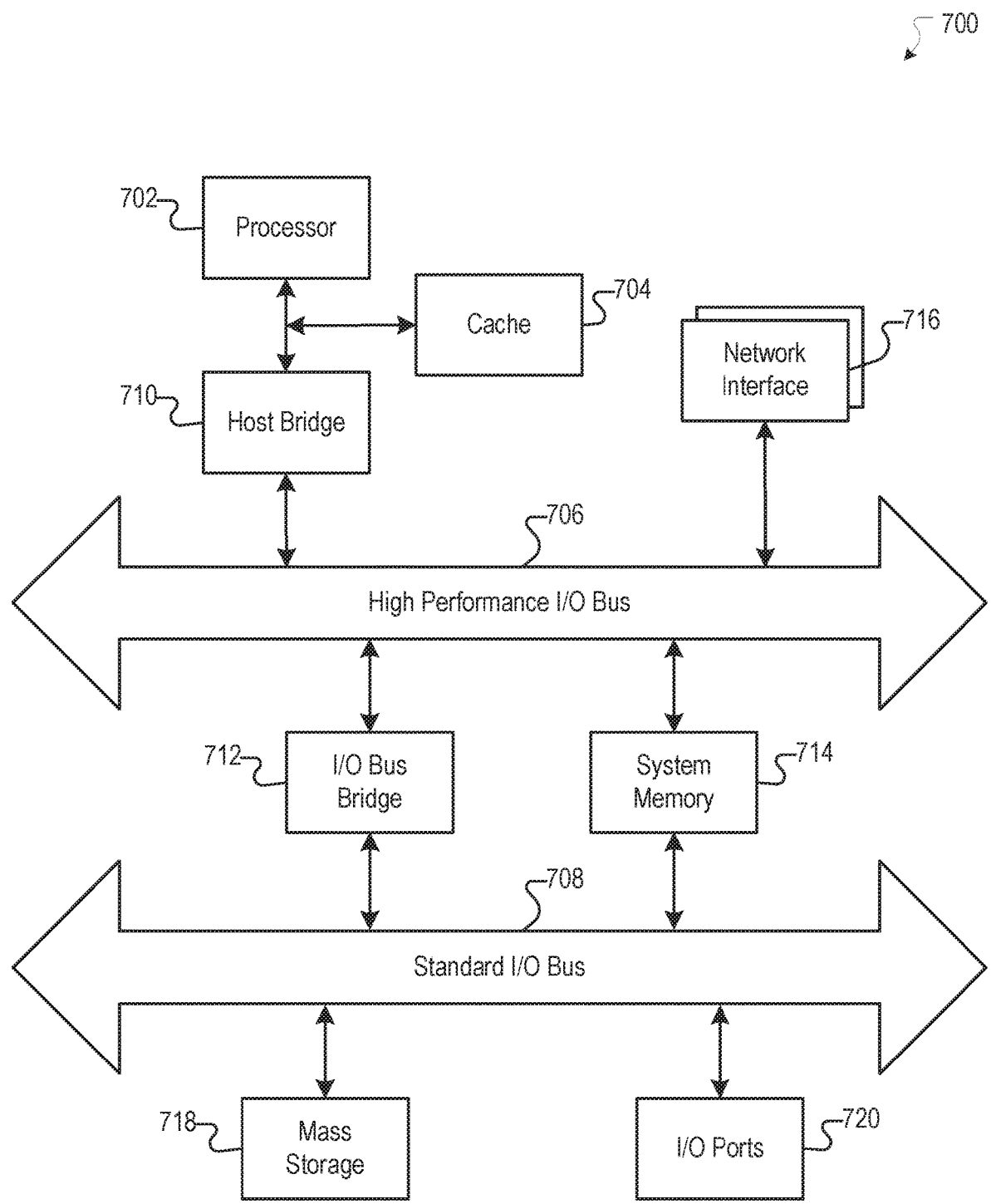
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, one or more source video clips comprising one or more video segments;
   performing, by the computing system, object recognition to identify objects depicted in the one or more source video clips using one or more machine learning techniques;
   determining, by the computing system, whether the one or more source video clips includes a video segment depicting at least one of a landmark or a particular person;
   identifying, by the computing system, a first theme based on the determination whether the one or more source video clips includes a video segment depicting at least one of a landmark or a particular person;
   selecting, by the computing system, a plurality of video segments from the one or more source video clips, based on the first theme;
   excluding, by the computing system, a first video segment from the plurality of video segments based on:
      a determination that the first video segment should not be cropped when a video segment duration of the first video segment is longer than a specified video segment duration; and
   generating, by the computing system, a compiled video comprising the plurality of video segments.

2. The computer-implemented method of claim 1, wherein the first theme is an automatically determined theme based on video characteristics of the one or more source video clips.

3. The computer-implemented method of claim 1, further comprising:
   identifying a second theme;
   selecting a second plurality of video segments from the one or more source video clips based on the second theme; and
   generating a second compiled video comprising the second plurality of video segments.

4. The computer-implemented method of claim 3, further comprising presenting the compiled video and the second compiled video for selection by a user.

5. The computer-implemented method of claim 1, wherein the plurality of video segments are selected based on at least one of object recognition or facial recognition performed using the one or more machine learning techniques.

6. The computer-implemented method of claim 1, wherein the plurality of video segments are selected based on user characteristic information comprising at least one of an interest, a tendency, or a preference of a user as determined based on previous content postings of the user to a social networking system.

7. The computer-implemented method of claim 1, further comprising performing video normalization of the plurality of video segments in the compiled video.

8. The method of claim 1, wherein the first video segment comprises a speech longer than the specified video segment duration.

9. A system comprising:
at least one processor; and
a memory storing instructions that, when executed by the at least one processor, cause the system to perform a method comprising:
receiving one or more source video clips comprising one or more video segments;
performing object recognition to identify objects depicted in the one or more source video clips using one or more machine learning techniques;
determining whether the one or more source video clips includes a video segment depicting at least one of a landmark or a particular person;
identifying a first theme based on the determination whether the one or more source video clips includes a video segment depicting at least one of a landmark or a particular person;
selecting a plurality of video segments from the one or more source video clips;
based on the first theme;
excluding a first video segment from the plurality of video segments based on:
a determination that the first video segment should not be cropped when a video segment duration of the first video segment is longer than a specified video segment duration; and
generating a compiled video comprising the plurality of video segments.

10. The system of claim 9, wherein the first theme is an automatically determined theme based on video characteristics of the one or more source video clips.

11. The system of claim 9, wherein the instructions cause the system to further perform:
identifying a second theme;
selecting a second plurality of video segments from the one or more source video clips based on the second theme; and
generating a second compiled video comprising the second plurality of video segments.

12. The system of claim 11, wherein the instructions cause the computing system to further perform presenting the compiled video and the second compiled video for selection by a user.

13. The system of claim 9, wherein the plurality of video segments are selected based on user characteristic information comprising at least one of an interest, a tendency, or a preference of a user as determined based on previous content postings of the user to a social networking system.

14. The system of claim 9, wherein the first video segment comprises a speech longer than the specified video segment duration.

15. A non-transitory computer-readable storage medium including instructions that, when executed by at least one processor of a computing system, cause the computing system to perform a method comprising:
receiving one or more source video clips comprising one or more video segments;
performing object recognition to identify objects depicted in the one or more source video clips using one or more machine learning techniques;
determining whether the one or more source video clips includes a video segment depicting at least one of a landmark or a particular person;
identifying a first theme based on the determination whether the one or more source video clips includes a video segment depicting at least one of a landmark or a particular person;
selecting a plurality of video segments from the one or more source video clips, based on the first theme;
excluding a first video segment from the plurality of video segments based on:
a determination that the first video segment should not be cropped when a video segment duration of the first video segment is longer than a specified video segment duration; and
generating a compiled video comprising the plurality of video segments.

16. The non-transitory computer-readable storage medium of claim 15, wherein the first theme is an automatically determined theme based on video characteristics of the one or more source video clips.

17. The non-transitory computer-readable storage medium of claim 15, wherein the method further comprises:
identifying a second theme;
selecting a second plurality of video segments from the one or more source video clips based on the second theme; and
generating a second compiled video comprising the second plurality of video segments.

18. The non-transitory computer-readable storage medium of claim 17, wherein the method further comprises presenting the compiled video and the second compiled video for selection by a user.

19. The non-transitory computer-readable storage medium of claim 15, wherein the plurality of video segments are selected based on user characteristic information comprising at least one of an interest, a tendency, or a preference of a user as determined based on previous content postings of the user to a social networking system.

20. The non-transitory computer-readable storage medium of claim 15, wherein the first video segment comprises a speech longer than the specified video segment duration.

* * * * *